United States Patent
Kim et al.

(10) Patent No.: US 11,074,279 B2
(45) Date of Patent: *Jul. 27, 2021

(54) METHOD FOR PROVIDING CHATTING SERVICE WITH CHATBOT ASSISTED BY HUMAN COUNSELOR

(71) Applicant: SAMSUNG SDS CO., LTD., Seoul (KR)

(72) Inventors: Jin Woon Kim, Seoul (KR); Chang Pil Kim, Seoul (KR); Ji Hun Kim, Seoul (KR); Joon Won Lee, Seoul (KR); Bong Won Nah, Seoul (KR); Byung Jae Park, Seoul (KR); Seul Gi Kang, Seoul (KR); Jin Soo Lee, Seoul (KR); Keum Sik Im, Seoul (KR); Joo Hee Ahn, Seoul (KR); Young Min Park, Seoul (KR); Jean Su Byun, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/881,783

(22) Filed: May 22, 2020

(65) Prior Publication Data

US 2020/0285660 A1 Sep. 10, 2020

Related U.S. Application Data

(63) Continuation of application No. 16/045,063, filed on Jul. 25, 2018, now Pat. No. 10,698,933.

(30) Foreign Application Priority Data

Jul. 25, 2017 (KR) .................. 10-2017-0094263

(51) Int. Cl.
*G06F 16/33* (2019.01)
*G10L 15/22* (2006.01)
(Continued)

(52) U.S. Cl.
CPC ...... *G06F 16/3334* (2019.01); *G06F 16/3329* (2019.01); *G10L 15/22* (2013.01);
(Continued)

(58) Field of Classification Search
CPC . G06F 16/3334; G06F 16/3329; H04L 51/02; H04L 51/16; G10L 15/22;
(Continued)

(56) References Cited

U.S. PATENT DOCUMENTS

| 8,484,042 B2 | 7/2013 | Cloran |
| 10,698,933 B2* | 6/2020 | Kim ..................... G10L 15/22 |
| 2018/0047030 A1 | 2/2018 | Saso et al. |

FOREIGN PATENT DOCUMENTS

| JP | 2011-82839 A | 4/2011 |
| KR | 10-1575276 B1 | 12/2015 |
| KR | 10-2016-0132317 A | 11/2016 |

OTHER PUBLICATIONS

Bing Liu "Sentiment Analysis and Subjectivity" Handbook of Natural Language Processing, Second Edition, 2010, (38 pages total).

(Continued)

*Primary Examiner* — Thierry L Pham
(74) *Attorney, Agent, or Firm* — Sughrue Mion, PLLC (57) ABSTRACT

Provided is a method of providing an unmanned dialogue service according to an embodiment of the inventive concept. The method includes transmitting or receiving text message data constituting a dialogue to or from a user terminal in an unmanned dialogue model, analyzing the dialogue to determine whether a counselor switching situation has occurred, transmitting a dialogue handover request including information regarding the dialogue to a counselor management apparatus when it is determined that the counselor switching situation has occurred, and automatically switching into a mode for relaying transmission or reception (Continued)

of messages between the user terminal and a counselor terminal that receives a task for processing the dialogue handover request allocated by the counselor management apparatus.

18 Claims, 9 Drawing Sheets

(51) Int. Cl.
*G06F 16/332* (2019.01)
*H04L 12/58* (2006.01)
(52) U.S. Cl.
CPC ........ *H04L 51/02* (2013.01); *G10L 2015/225* (2013.01); *H04L 51/16* (2013.01)
(58) Field of Classification Search
CPC ... G10L 2015/225; G10L 13/08; G06N 20/00; G06Q 50/30
USPC ........................................................... 704/9
See application file for complete search history.

(56) References Cited

OTHER PUBLICATIONS

Wikipedia "Sentiment Analysis" Retrieved from URL: 'https://en.wikipedia.org/wiki/Sentiment_analysis' (7 pages total).

\* cited by examiner

METHOD FOR PROVIDING CHATTING SERVICE WITH CHATBOT ASSISTED BY HUMAN COUNSELOR

This application is a continuation of U.S. application Ser. No. 16/045,063 filed Jul. 25, 2018, which claims priority from Korean Patent Application No. 10-2017-0094263 filed on Jul. 25, 2017 in the Korean Intellectual Property Office, the disclosure of which is incorporated herein by reference in its entirety.

BACKGROUND

1. Field of the Disclosure

The inventive concept relates to a method of providing an unmanned dialogue service assisted by a human counselor, and more particularly, to a method of providing an unmanned dialogue service in which, when an unmanned dialogue service is provided between a user and a chatbot, a human counselor assists incompleteness of the chatbot.

2. Description of the Related Art

A technique for communicating with software on a messenger has been provided. According to this technique, users can continue dialogue with the software on a messenger. The software is generally referred to as a chatbot or a chatting bot. A chatting bot may be implemented to respond to a user's questions according to defined response rules. Artificial intelligence technology may be combined to enhance a chatting bot's dialogue skills.

As time passes, a chatting bot's dialogue skills will continue to evolve, but do not reach human dialogue skills yet. Therefore, it is required to provide a chatting bot service, that is, an unmanned dialogue service capable of appropriately complementing the incompleteness of chatting bots.

SUMMARY

Aspects of the inventive concept provide an unmanned dialogue service providing method and apparatus that automatically switch into a chatting dialogue service with a human counselor when a situation in which a speaker should be changed to the human counselor instead of a chatting bot is detected through analysis of a dialogue between a user and the chatting bot.

Aspects of the inventive concept also provide an unmanned dialogue service providing method and apparatus that switch into a service for chatting with a human counselor after preferential checking by the human agent when a counselor switching situation is detected through analysis of the dialogue between the user and the chatbot.

It should be noted that objects of the inventive concept are not limited to the above-described objects, and other objects of the inventive concept will be apparent to those skilled in the art from the following descriptions.

According to an aspect of the inventive concept, there is provided A method of providing an unmanned dialogue service, which is performed by an unmanned dialogue service apparatus, the method comprising: transmitting or receiving text message data constituting a dialogue to or from a user terminal in an unmanned dialogue model; analyzing the dialogue and determining whether a counselor switching situation has occurred; transmitting a dialogue handover request including information regarding the dialogue to a counselor management apparatus when it is determined that the counselor switching situation has occurred; and automatically switching into a mode for relaying transmission or reception of messages between the user terminal and a counselor terminal that receives a task for processing the dialogue handover request allocated by the counselor management apparatus.

According to another aspect of the inventive concept, there is provided A method of providing an unmanned dialogue service, which is performed by an unmanned dialogue service apparatus, the method comprising: transmitting or receiving text message data constituting a dialogue to or from a user terminal in an unmanned dialogue model; analyzing the dialogue and determining whether an abnormal situation has occurred; transmitting an assistance request including information regarding the dialogue to a human agent system when it is determined that the abnormal situation has occurred; and automatically switching into a mode for transmitting or receiving message between the user terminal and a counselor terminal according to a counselor switching command input of a human agent through the human agent terminal, the human agent terminal being connected to the human agent system and configured to receive a task for processing the assistance request allocated by the human agent system, wherein the determining of whether an abnormal situation has occurred comprises: detecting a negative expression from text that is received from the user terminal and constitutes the dialogue; and determining whether an abnormal situation has occurred using at least one of the number and frequency of negative expressions detected.

According to another aspect of the inventive concept, there is provided An unmanned dialogue service apparatus comprising: an utterance data input unit configured to transmit or receive text message data constituting a dialogue to or from a user terminal in an unmanned dialogue model; and a counselor switching situation determination unit configured to analyze the dialogue and determine whether a counselor switching situation has occurred, configured to transmit a dialogue handover request including information regarding the dialogue to a counselor management apparatus when it is determined that the counselor switching situation has occurred, and configured to automatically switch, for the dialogue, into a mode for relaying transmission or reception of messages between the user terminal and a counselor terminal that receives a task for processing the dialogue handover request allocated by the counselor management apparatus.

BRIEF DESCRIPTION OF THE DRAWINGS

The above and other aspects and features of the inventive concept will become more apparent by describing in detail exemplary embodiments thereof with reference to the attached drawings, in which.

DETAILED DESCRIPTION OF THE EMBODIMENTS

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

Hereinafter, some embodiments of the inventive concept will be described with reference to the drawings.

The configurations and operations of unmanned dialogue service providing systems according to some embodiments of the inventive concept will be described with reference to FIGS. 1 and 2.

Figure 1:
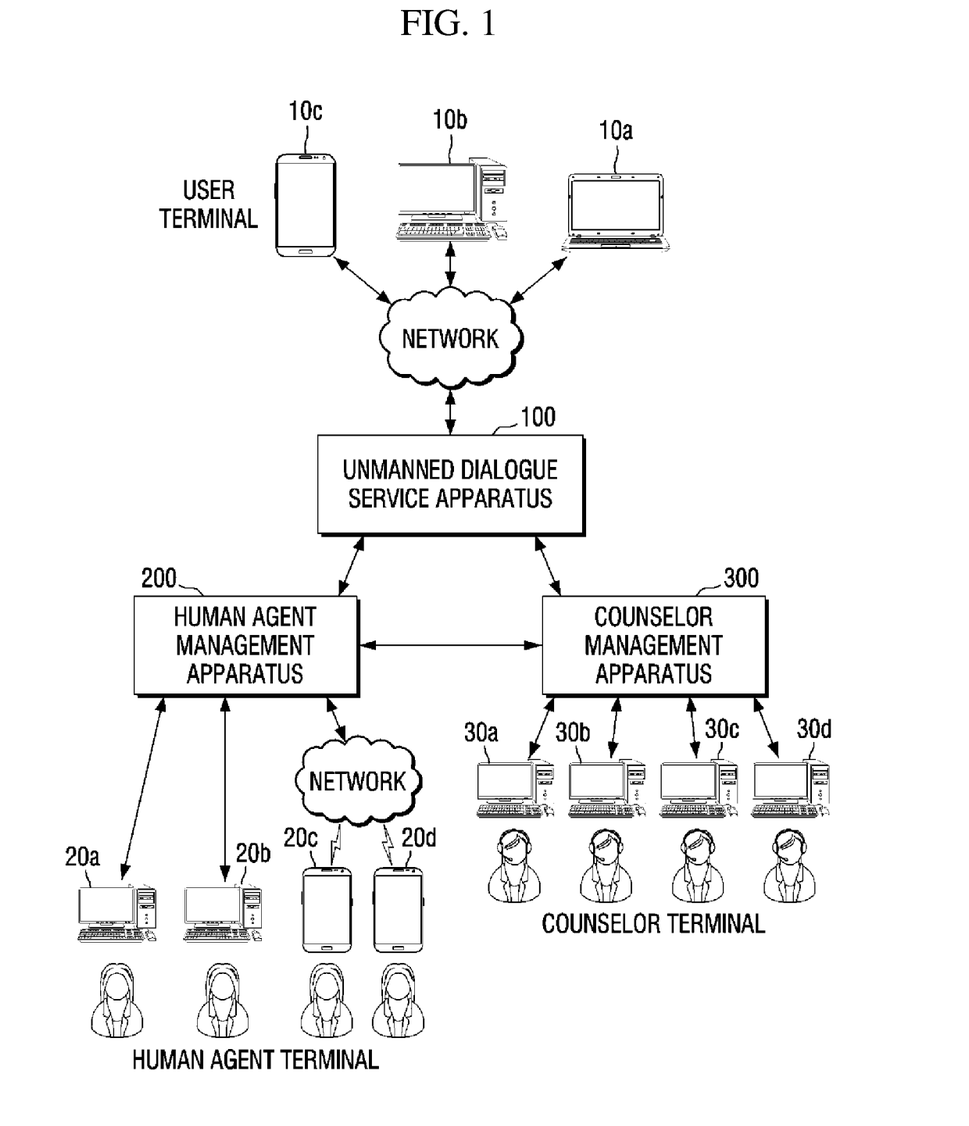
FIG. 1 is a first configuration diagram of an unmanned dialogue service system according to an embodiment.

FIG. 1 shows a configuration of a first embodiment of the unmanned dialogue service providing system. As shown in FIG. 1, the unmanned dialogue service providing system according to this embodiment includes an unmanned dialogue service apparatus 100 and a counselor management apparatus 300. Alternatively, the unmanned dialogue service providing system may further include a human agent management apparatus 200 as well as the unmanned dialogue service apparatus 100 and the counselor management apparatus 300.

The unmanned dialogue service apparatus 100 is connected to user terminals 10a, 10b, and 10c over a network such as the Internet. The unmanned dialogue service apparatus 100 provides, to the user terminals 10a, 10b, and 10c, a messenger dialogue service with a chatting hot. The unmanned dialogue service apparatus 100 manages a dialogue composed of a user message input through the user terminals 10a, 10b, and 10c and a chatting hot message created by the unmanned dialogue service apparatus 100 in response to the user message. In order to manage the dialogue, the unmanned dialogue service apparatus 100 may store one or more dialogue models.

The unmanned dialogue service apparatus 100 analyzes the dialogue to determine whether the dialogue is in an "counselor switching situation." When it is determined that the dialogue is in the counselor switching situation, the unmanned dialogue service apparatus 100 transmits, to the counselor management apparatus 300, a dialogue handover request including information regarding the dialogue. History information of the dialogue may be included in the dialogue handover request. In the history information, messages of the user and messages of the chatting bot may be arranged in the order of time.

The counselor management apparatus 300 may be connected to a plurality of counselor terminals 30a, 30b, 30c, and 30d over a network. The plurality of counselor terminals 30a, 30b, 30c, and 30d are terminal devices that are used by human counselors. The counselor management apparatus 300 allocates a task for processing the handover request to one of the plurality of counselor terminals 30a, 30b, 30c, and 30d.

The counselor switching situation indicates a situation in which it is no longer possible for the chatting bot to advance the dialogue with the user. The term "counselor switching situation" will be described in detail below with reference to some specific examples.

In an embodiment, when a predetermined expression is detected from the text constituting the dialogue, it may be determined that the counselor switching situation has occurred. In this case, the predetermined expression includes a keyword and a natural language expression indicating a human-counselor-dedicated task. For example, a keyword and a natural language expression related to a task in which it is worth for a human counselor to intervene may be included in the predetermined expression. For example, a key word "card lost" or "loan consultation" and a natural language expression such as "I want to make a new credit card" or "I want to borrow a business loan" are included in the predetermined expression.

In an embodiment, when the intention of the recent message received from the user terminal is a request to process the human-counselor-dedicated task, it may be determined that the counselor switching situation has occurred. For example, when the user intention contained in the recent message is determined as "I want to get a loan consultation," it may be determined that the counseling switching situation has occurred. Various computing methodologies, such as a pattern matching scheme, a rule-based scheme, and a machine-learning-based intention determination model learning scheme, may be utilized to extract the user's utterance intentions from the user's message.

In an embodiment, a negative expression may be detected from text that is received from the user terminal and constitutes the dialogue, and a counselor switching situation has occurred may be determined using at least one of the number and frequency of negative expressions detected.

In an embodiment, the negative expression indicates a predetermined banned word. The banned word may include at least one of profanities, obscene phrases, and one or more custom banned words designated by an unmanned dialogue service provider.

In another embodiment, the negative expression is an expression indicating a negative sentiment. Whether the expression indicates a negative sentiment may be determined utilizing sentiment analysis, which is a well-known technology. That is, if a result obtained by performing sentiment analysis on a newly input user message does not reach a reference (i.e., the result is analyzed as a negative sentiment with respect to the reference), the dialogue may be determined as being in the abnormal situation. Refer to the following documents for the sentiment analysis.

Web document "https://en.wikipedia.org/wiki/Sentiment_analysis"

Liu, Bing (2010). "Sentiment Analysis and Subjectivity". In Indurkhya, N.; Damerau, F. J. Handbook of Natural Language Processing (Second ed.)

In an embodiment, when an expression for calling a counselor is detected from text that is received from the user terminal and constitutes the dialogue, it may be determined that the counselor switching situation has occurred. For example, when the recent text that is received from the user terminal and constitutes the dialogue is "I want to talk to the counselor," it may be determined that the counselor switching situation has occurred.

In an embodiment, when it is not possible to identify the intention of the message recently received from the user terminal according to a dialogue model of the dialogue and also a counter-question for identifying the intention is asked a predetermined number of times or more, it may be determined that the counselor switching situation has occurred. For example, it may be difficult to determine whether the intention of the user's recent message "My notebook went flat, and where should I go?" is an inquiry for notebook AS center location or an inquiry for notebook sales stores, and also the user intention cannot be identified although a counter-question sentence is created to identify the intention a predetermined number of times or more. In this case, it may be determined that the counselor switching situation has occurred.

In an embodiment, the dialogue model of the dialogue may be a scenario model, and also slot filling may not be completed although a predetermined time passes after the dialogue is started or a user makes an answer a predetermined number of times or more in response to a question message of the chatting bot. In this case, it may be determined that the counselor switching situation has occurred. For example, a dialogue model of a chatting bot making a dialogue with a user may be a slot-filling-based scenario model, and also the slot filling may not be completed although a total of five slots (e.g., name, gender, age, residence, vehicle presence) need to be obtained from the user among a total of fifteen user answers (e.g., the predetermined number is 15). In this case, it may be determined that the counselor switching situation has occurred. When the chatting bot continues to be responsible for slot filling, a user will not feel that the dialogue is proceeding and also will be dissatisfied with the service. According to this embodiment, by preferentially giving an opportunity for the slot filling to the chatting bot and then enabling a special counselor to quickly process unfilled slots when the chat bot is not successful in the slot filling within a given time or a given number of dialogues, it is possible to prevent complaint factors of the user.

In an embodiment, when the duration of the dialogue exceeds a reference, it is determined whether the counselor switching situation has occurred. For example, the dialogue model of the dialogue is a scenario model, and thus there may not be a reason to talk for a long time like a daily dialogue model. In this case, when the duration of the dialogue exceeds the reference, it may be determined that the counselor switching situation has occurred.

The reference of the duration of the dialogue may be set depending on the dialogue model. For example, when the currently applied dialogue model is a daily dialogue model or a question-answer dialogue model, the reference of the duration of the dialogue may be set to a long or maximum value. On the other hand, when the currently applied dialogue model is a scenario-based model, it is preferable that the reference of the duration of the dialogue be set based on an estimated time from a scenario entry time to a scenario exit time. For example, the estimated time from the scenario entry time to the scenario exit time may be set to a longer value as the number of states that should be experienced from the scenario entry time to the scenario exit time increases.

The unmanned dialogue service apparatus 100 analyzes the dialogue to further determine whether the dialogue is in an "abnormal situation." The term "abnormal situation" indicates a state in which the chatting bot is no longer appropriate to advance the dialogue with the user. When it is determined that the abnormal situation has occurred, the unmanned dialogue service apparatus 100 may transmit an assistance request to the human agent management apparatus 200.

In this case, a human agent may check history information of the dialogue through a human agent user interface displayed on a human agent terminal and then input a counselor switching command (see FIG. 7B or FIG. 7C) or a command for continuing the unmanned dialogue (see FIG. 7A) depending on the severity of the expression.

The human agent management apparatus 200 is connected to a plurality of human agent terminals 20a, 20b, 20c, and 20d over a network. The plurality of human agent terminals 20a, 20b, 20c, and 20d are terminal devices used by the human agent. The human agent management apparatus 200 allocates a task for processing the assistance request to one of the plurality of human agent terminals.

Whether the abnormal situation has occurred may be determined using at least one of the number and frequency of negative expressions detected in the dialogue. However, as described above, the counselor switching situation may also be determined on the basis of at least one of the number or frequency of negative expressions detected in the dialogue. In this case, it can be understood that the criterion of the counselor switching situation is stricter than that of the abnormal situation. For example, when two negative expressions are detected in the dialogue, the unmanned dialogue service apparatus 100 may determine that the abnormal situation has occurred and transmit the assistance request to the human agent management apparatus 200. When five negative expressions are detected in the dialogue, the unmanned dialogue service apparatus 100 may determine that the counselor switching situation has occurred and then transmit the dialogue handover request to the counselor management apparatus 300.

The ability required for the human agent may be an average language comprehension ability of adults. The human agent is distinguished from a counselor that is specially trained in association with a response to a user's request.

The human agent terminals may include a human agent terminal 20a or 20b connected to the human agent management apparatus 200 over a local network or a human agent terminal 20c or 20d connected to the human agent management apparatus 200 over an open network such as the Internet. That is, the human agent may be a person who is responsible for an unmanned dialogue service assistance task in a predetermined space such as a call center office or a person who is freely responsible for an unmanned dialogue service assistance task in an undesignated space.

When the task for processing the assistance request is allocated by the human agent management apparatus 200, the human agent terminals 20a, 20b, 20c, and 20d display information regarding the assistance request and also display a human agent user interface for receiving dialogue advancement guide information from the human agent. As described above, the history information of the dialogue may be included in the assistance request. That is, the human agent user interface may include a display region for displaying messages communicated between the user and the chatting bot in the order of time and an input region for receiving guide information for advancing the dialogue between the user and the chatting bot.

Various situations have been reviewed in which the unmanned dialogue service apparatus 100 analyzes the dialogue to determine whether the counselor switching situation has occurred while transmitting or receiving text message data constituting the dialogue to or from a user terminal. When the counselor switching situation has occurred, the user makes a dialogue with a counselor instead of the chatting bot.

When a result of the unmanned dialogue service apparatus 100 analyzing the dialogue is that the abnormal situation has occurred but the counselor switching situation has not occurred, the human agent may determine whether to apply the counselor instead of the chatting bot.

While the user is making a dialogue with the counselor instead of the chatting bot, the unmanned dialogue service apparatus 100 no longer performs a process of analyzing a user message and creating a response message for the user message. Instead, the unmanned dialogue service apparatus 100 delivers the user message to the counselor management apparatus 300 and operates in a by-pass mode in which a message delivered through the counselor management apparatus 300 and input to a counselor terminal 30a, 30b, 30c, or 30d is delivered to the user terminal 10a, 10b, or 10c.

Figure 2:
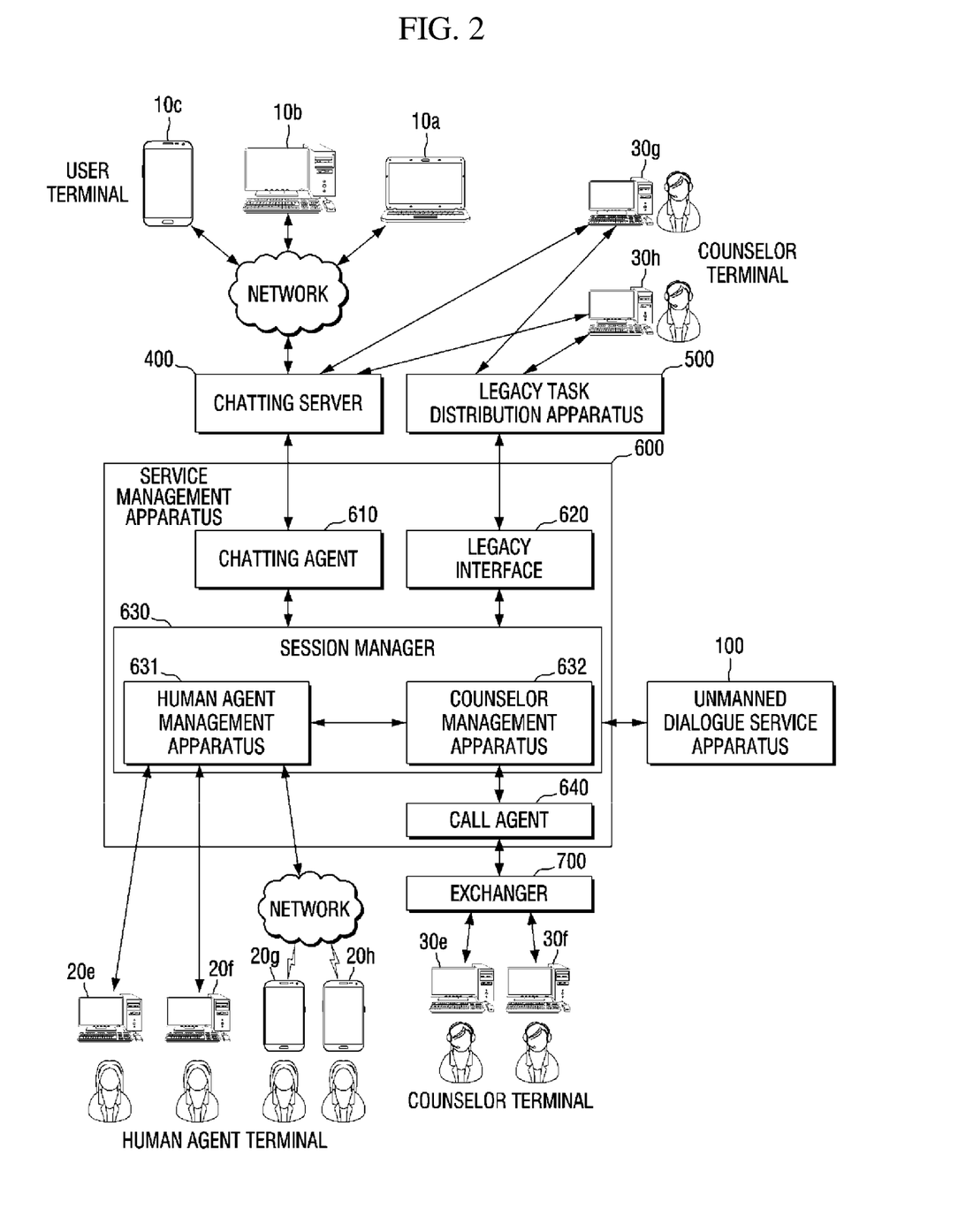
FIG. 2 is a second configuration diagram of an unmanned dialogue service system according to an embodiment.

FIG. 2 shows a configuration of a second embodiment of the unmanned dialogue service providing system. As shown in FIG. 2, the unmanned dialogue service providing system according to this embodiment includes an unmanned dialogue service apparatus 100 and a service management apparatus 600.

The unmanned dialogue service apparatus 100 of the unmanned dialogue service providing system shown in FIG. 2 operates similarly to that of the unmanned dialogue service apparatus of FIG. 1 in that the apparatus analyzes a dialogue between the chatting bot and the user terminal 10a, 10b, or 10c and creates a dialogue handover request when it is determined that the counselor switching situation has occurred.

The human agent management apparatus 200 of FIG. 1 is implemented as a human agent management module 631 inside a session manager 630 of the service management apparatus 600, and the counselor management apparatus 300 of FIG. 1 is implemented as a counselor management module 632 inside the session manager 630 of the service management apparatus 600. Also, the human agent management apparatus of the present disclosure may be configured in the form of an independent apparatus 200 as shown in FIG. 1 and may be configured in the form of a software module 631 inside the session manager 630 as shown in FIG. 2. That is, the counselor management apparatus of the present disclosure may be configured in the form of an independent apparatus 300 as shown in FIG. 1 and may be configured in the form of a software module 632 inside the session manager 630 as shown in FIG. 2.

A chatting message input by a user to the user terminal 10a, 10b, or 10c is transmitted to a chatting server 400 over a network. The chatting server 400 delivers the chatting message to a chatting agent 610 of the service management apparatus 600. The chatting agent 610 is a software interface module serving as an adaptor between the session manager 630 and an external apparatus.

When a session for the chatting message delivered by the chatting agent 610 is not established, the session manager 630 establishes a new session for a dialogue to be started from the chatting message and delivers the chatting message to the unmanned dialogue service apparatus 100 along with information regarding the new session. The unmanned dialogue service apparatus 100 creates a response message for the chatting message and matches the information regarding the new session to the dialogue including the chatting message. The unmanned dialogue service apparatus 100 provides the response message to the session manager 630 along with the information regarding the new session. Subsequently, the response message is transmitted to the user terminal 10a, 10b, or 10c via the chatting agent 610 and the chatting server 400.

As the chatting message included in the dialogue is accumulated, the unmanned dialogue service apparatus 100 may allocate a chatting bot matched to a dialogue domain of the dialogue as a dialogue member and determine a dialogue model suitable for a dialogue pattern, thereby providing an unmanned dialogue service. The session manager 630 also provides the information regarding the new session to the chatting server 400. Thus, the chatting server 400 manages session information of the service management apparatus 600 matched to the dialogue.

When the chatting message is not an initial message for starting the dialogue, the chatting server 400 provides the session information of the service management apparatus 600 matched to the dialogue to the chatting agent 610 of the service management apparatus 600 together with the chatting message.

The service management apparatus 600 has a hybrid architecture that enables a conventional legacy call center system and the unmanned dialogue service apparatus 100 to interoperate to provide a service. A legacy interface 620, a call agent 640, and the chatting agent 610, which operate on dedicated hardware, are provided to implement the hybrid architecture.

When the counselor switching situation has occurred in a mode for an unmanned dialogue with a chatting bot, the unmanned dialogue service apparatus 100 provides a dialogue handover request to the counselor management module 632 of the session manager 630. Thus, the unmanned dialogue service apparatus 100 automatically switches into a mode for relaying transmission or reception of messages between the user terminal and a counselor terminal that receives a task for processing the dialogue handover request allocated by the counselor management module 632.

Figure 7A:
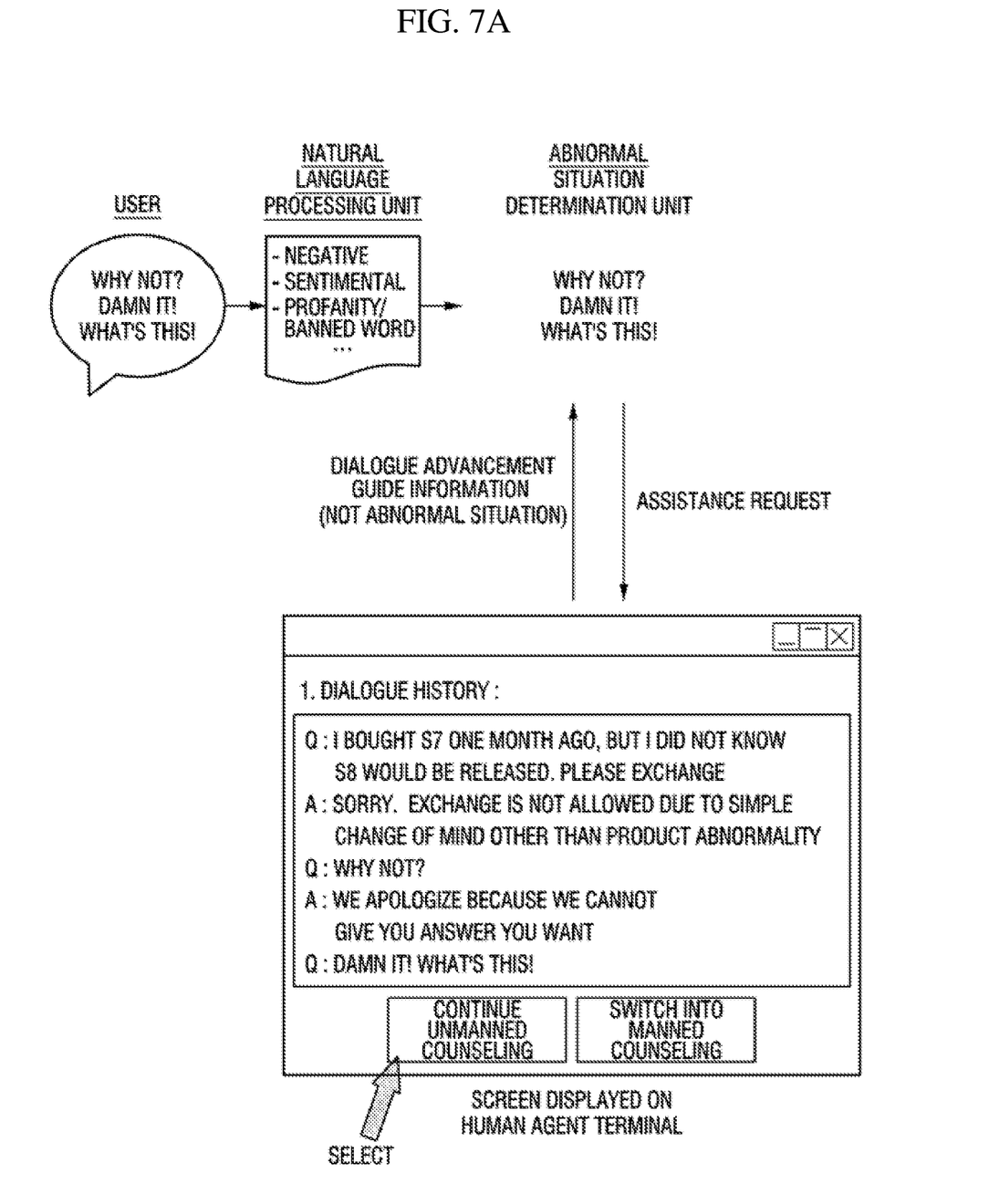
FIGS. 7A to 7C are conceptual views illustrating an operation performed when a dialogue is determined as being abnormal, according to some embodiments.
Figure 7B:
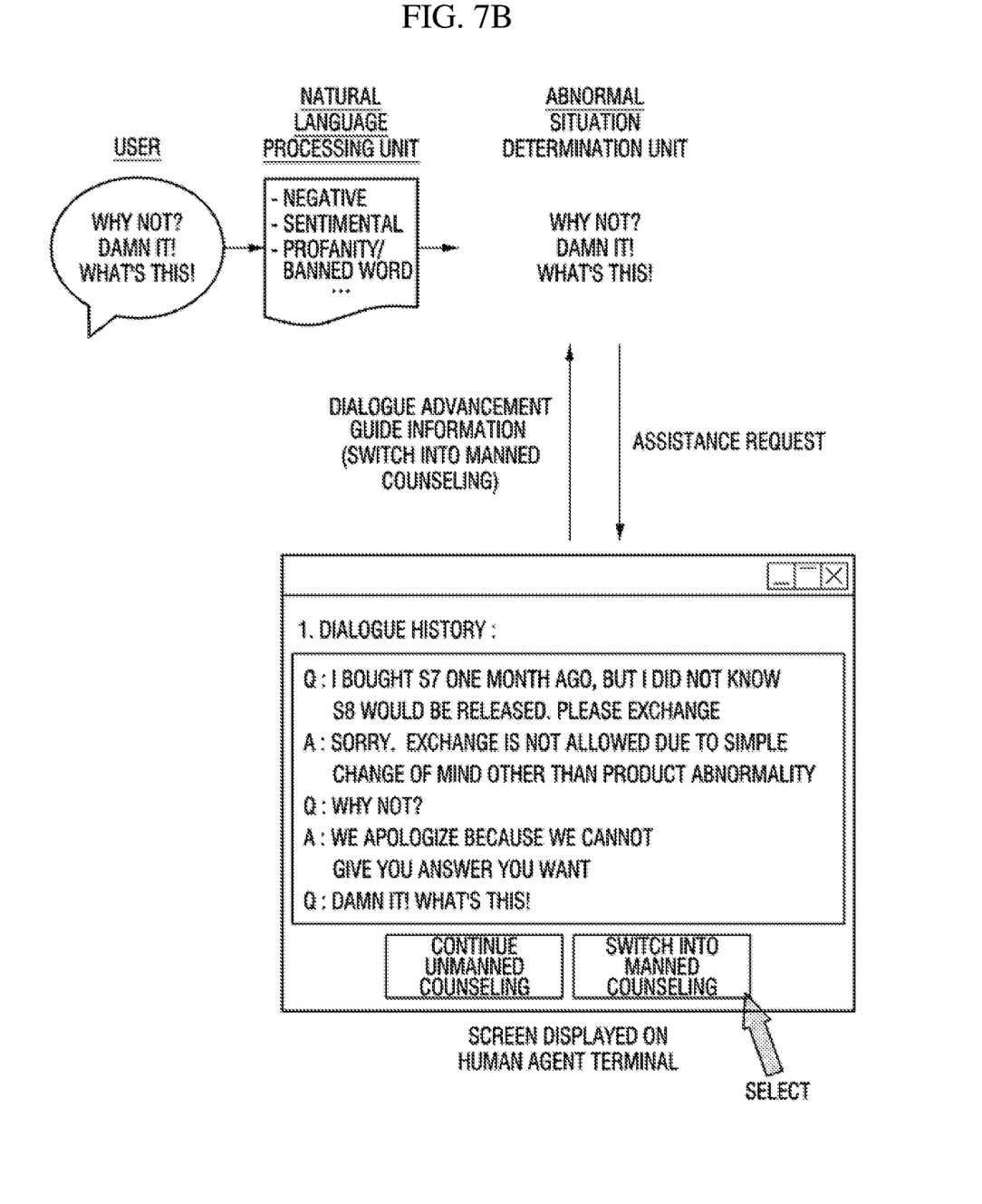

When a result of analyzing the dialogue between the user and the chatting bot is that an abnormal situation has occurred, the human agent may input, through a human agent interface displayed on a human agent terminal 20e, 20f, 20g, or 20h, a command for advancing a chatting with a counselor (see FIG. 7B). In this case, when an input signal of the command for advancing a chatting with a counselor is received from the human agent terminal 20e, 20f, 20g, or 20h, the human agent management module 631 provides session information for the dialogue to the counselor management module 632. The counselor management module 632 delivers the session information for the dialogue to a legacy task distribution apparatus 500 through the legacy interface 620. The legacy task distribution apparatus 500 allocates a task corresponding to the dialogue to one of counselor terminals 30g and 30h connected to the legacy task distribution apparatus 500. The task corresponding to the dialogue includes the session information for the dialogue.

The counselor terminal 30g or 30h transmits a chatting connection request including the session information to the chatting server 400. Like the service management apparatus 600, the chatting server 400 manages the session information in the service management apparatus 600 on a dialogue basis. Thus, the chatting server 400 may change a partner of the dialogue, that is, replace the chatting bot by the counselor terminal 30g or 30h in response to reception of the chatting connection request.

Figure 7C:
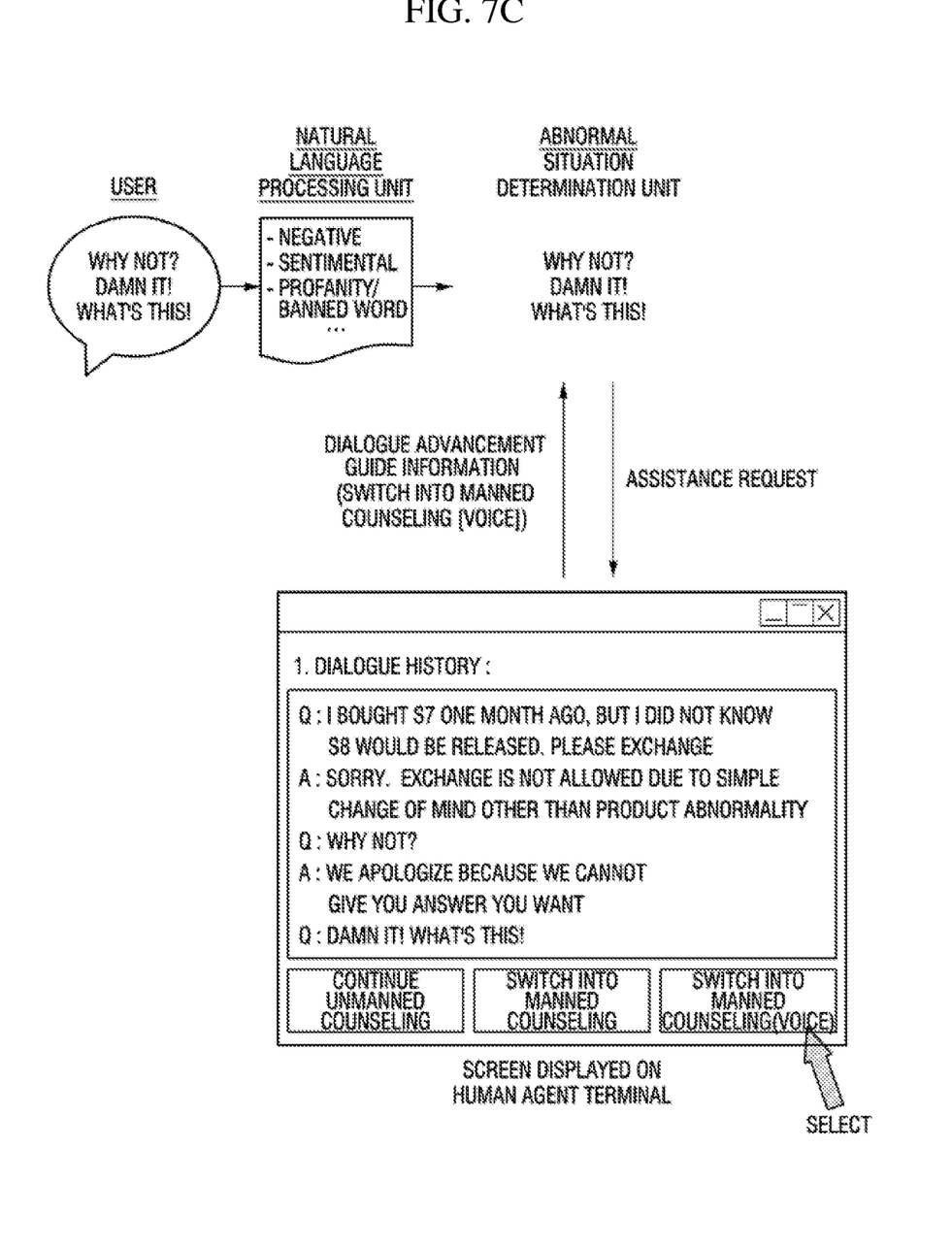

The human agent may input, through the human agent interface displayed on the human agent terminal 20e, 20f, 20g, or 20h, a command for advancing a phone consultation with a counselor (see FIG. 7C). In this case, when an input signal of the command for advancing the phone consultation with the counselor is received from the human agent terminal 20e, 20f, 20g, or 20h, the human agent management module 631 provides session information for the dialogue to the counselor management module 632. The counselor management module 632 delivers information regarding phone connection to the user terminal 10a, 10b, or 10c to an exchanger 700 through the call agent 640. The exchanger 700 establishes a phone call with the user terminal 10a, 10b, or 10c using the phone connection information, and allocates a phone consultation task to one of counselor terminals 30e and 30f connected to the exchanger 700 when the establishment of the phone call is successful. In an embodiment, the exchanger 700 receives history information of the dialogue from the counselor management module 632 through the call agent 640 and provides the history information to the counselor terminal 30e or 30f.

Figure 3:
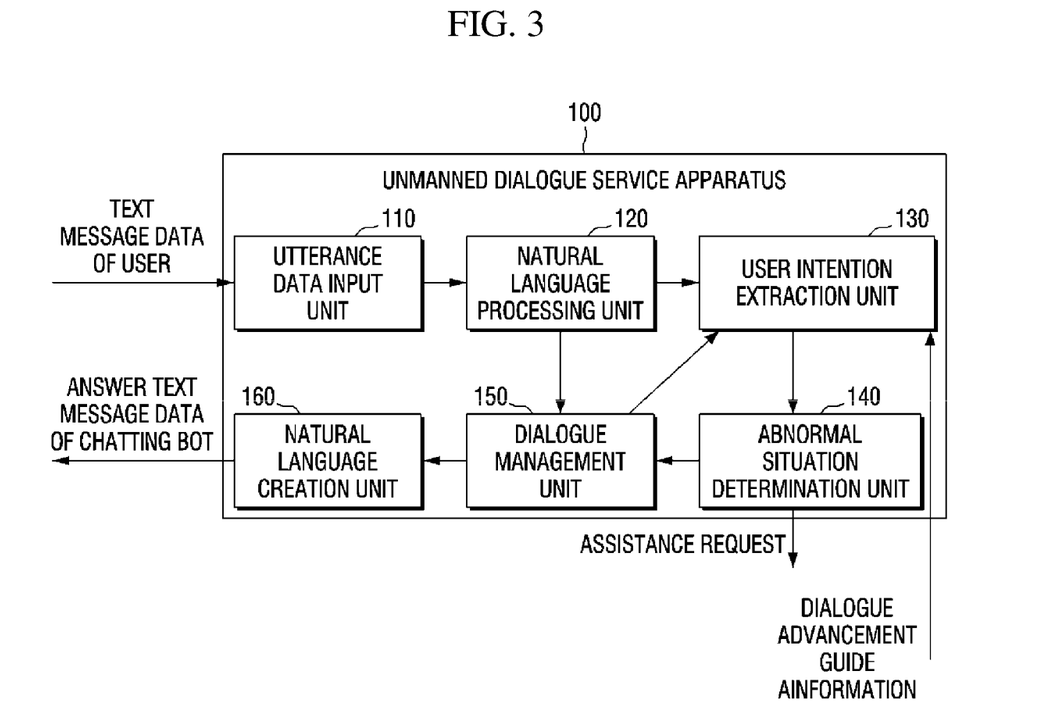
FIG. 3 is a first block diagram of an unmanned dialogue service apparatus according to an embodiment.

The configuration and operation of the unmanned dialogue service apparatus according to an embodiment of the inventive concept will be described below with reference to FIG. 3. The unmanned dialogue service apparatus 100 according to this embodiment includes an utterance data input unit 110 configured to receive text message data of a user created by a user terminal, a natural language processing unit 120 configured to receive a text message from the utterance data input unit 110 and perform tokenizing, natural language processing, natural language understanding, and the like, a dialogue management unit 150 configured to receive a processing result of the natural language processing unit 120 and manage advancement of a dialogue including the text message according to a dialogue model of the dialogue, and a natural language creation unit 160 configured to create an answer to the text message in the form of a natural language under control of the dialogue management unit 150.

The unmanned dialogue service apparatus 100 according to this embodiment further includes a user intention extraction unit 130 and a counselor switching situation determination unit 140.

The user intention extraction unit 130 receives a processing result of the natural language processing unit 120 and dialogue model information of the dialogue management unit 150 and extracts the user's utterance intentions according to the text message of the user.

The counselor switching situation determination unit 140 analyzes the dialogue to determine whether a counselor switching situation has occurred. The counselor switching situation determination unit 140 may receive the processing result of the natural language processing unit 120 and the dialogue model information of the dialogue management unit 150 as well as a result of the user intention extraction unit 130 extracting the user's intention so as to determine whether a counselor switching situation has occurred. A part described with reference to FIG. 1 may be referred to for the operation of the counselor switching situation determination unit 140 according to various types of counselor switching situations. When the counselor switching situation has occurred in a mode for an unmanned dialogue with the chatting bot, the counselor switching situation determination unit 140 may provide a dialogue handover request to the counselor management apparatus. Thus, the unmanned dialogue service apparatus 100 automatically switches into a mode for relaying transmission or reception of messages between the user terminal and a counselor terminal that receives a task for processing the dialogue handover request allocated by the counselor management apparatus.

When it is determined that an abnormal situation has occurred, the counselor switching situation determination unit 140 may transmit an assistance request for advancing the dialogue to an external apparatus. The external apparatus may be, for example, a human agent management apparatus.

As described with reference to FIG. 1, when a specific type of abnormal situation (e.g., detection of an actually almost meaningless negative expression) is not an actual abnormal situation and thus the human agent may advance the unmanned dialogue service, the dialogue advancement guide information may be provided to the dialogue management unit 150 unlike those shown in FIG. 3, and the dialogue management unit 150 may continue the dialogue according to the dialogue model.

Figure 4:
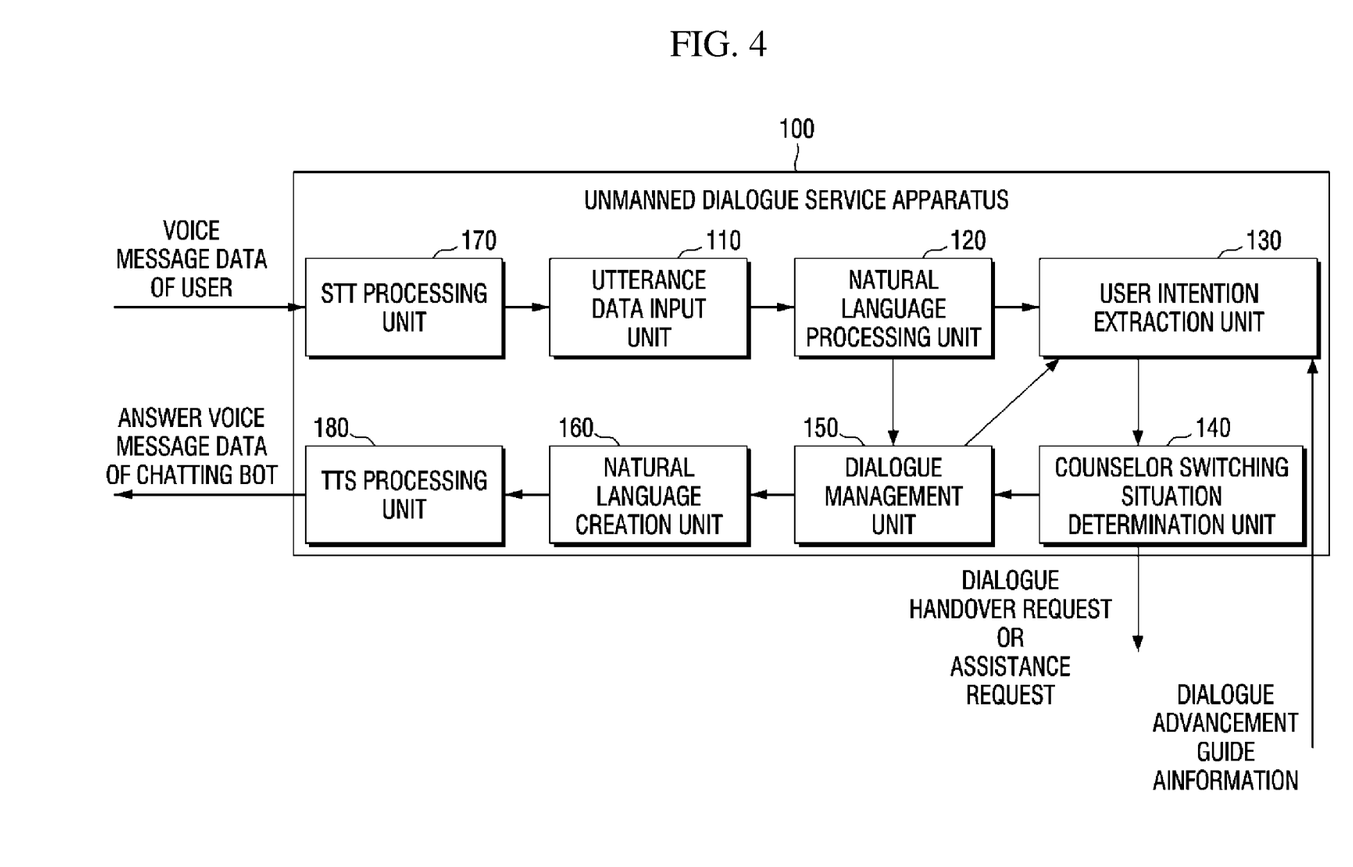
FIG. 4 is a second block diagram of an unmanned dialogue service apparatus according to an embodiment.

The configuration and operation of the unmanned dialogue service apparatus according to an embodiment of the inventive concept will be described below with reference to FIG. 4. The unmanned dialogue service apparatus 100 according to this embodiment is the same as the unmanned dialogue service apparatus 100 described with reference to FIG. 3, except that a voice message input function and a voice message output function are additionally included. That is, voice message data of a user transmitted from a user terminal is provided to a speech-to-text (STT) processing unit 170, is converted into text message data, and then provided to the utterance data input unit 110, and a response text message created by the natural language creation unit 160 is provided to a text-to-speech unit (TTS) 180 and is converted into a voice message.

The unmanned dialogue service apparatus 100 according to this embodiment provides a service for making a dialogue with a chatting bot by voice. However, when it is determined during the dialogue that a counselor switching situation has occurred, the unmanned dialogue service apparatus 100 automatically switches into a mode for relaying transmission or reception of messages between the user terminal and a counselor terminal that receives a task for processing the dialogue handover request allocated by the counselor management apparatus. The unmanned dialogue service apparatus 100, which is a speaker connected to the Internet, may be connected to the user terminal, which has a microphone.

Figure 5:
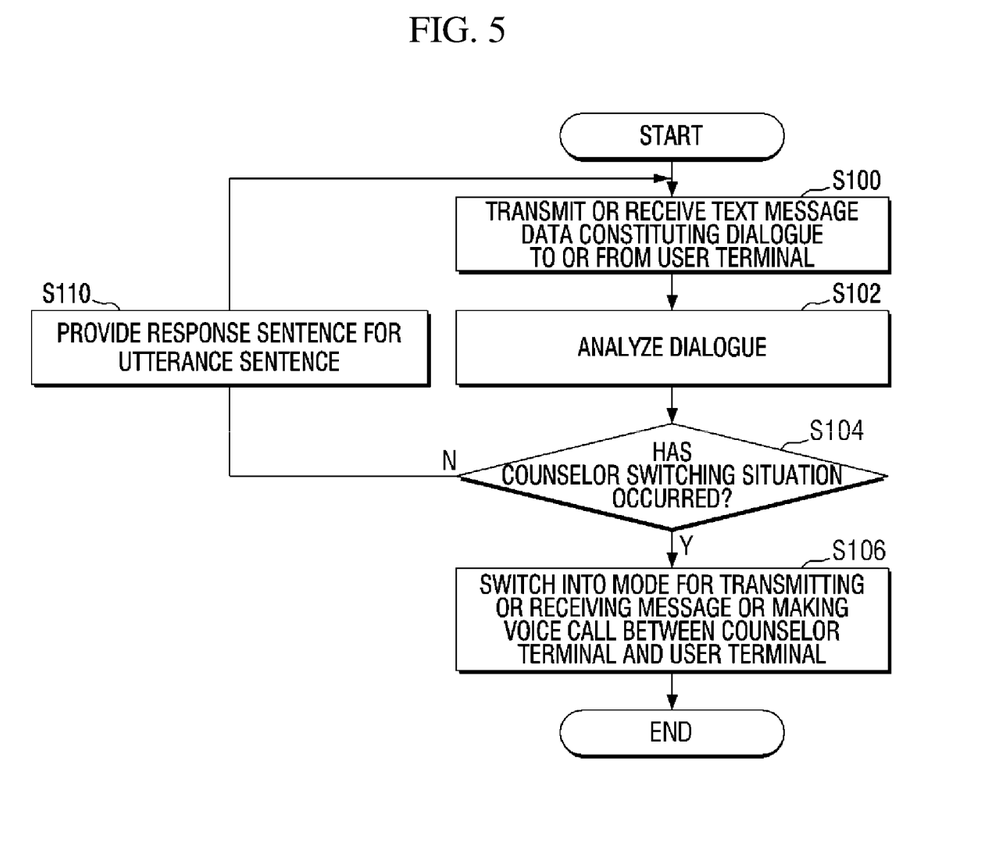
FIG. 5 is a first flowchart of an unmanned dialogue service providing method according to an embodiment.

An unmanned dialogue service providing method according to an embodiment of the inventive concept will be described below with reference to FIG. 5. The unmanned dialogue service providing method according to this embodiment may be performed by a computing apparatus.

To facilitate understanding, each operation of the unmanned dialogue service providing method according to this embodiment will be described assuming that the computing apparatus is the unmanned dialogue service apparatus 100 described with reference to FIGS. 1 to 4.

First, by transmitting or receiving text message data constituting a dialogue to or from a user terminal, an unmanned dialogue is made between a user and a chatting bot (S100). Then, the unmanned dialogue is analyzed (S102). When a result of the analysis is that a counselor switching situation has not occurred (S104), a response sentence for an utterance sentence is provided (S110). When a result of the analysis is that a counselor switching situation has occurred (S104), a dialogue handover request is transmitted to a counselor management apparatus (S106). In this case, the user does not perform any operation to make a dialogue with a counselor instead of the chatting bot. That is, according to this embodiment, the switching into the dialogue with the counselor is fully automatically carried out without the user's operation. Accordingly, according to this embodiment, it is possible to increase service satisfaction of users.

In some embodiments of the inventive concept, when a result of analyzing the dialogue is that an abnormal situation has occurred, some operations of the human agent management apparatus and the human agent terminal are performed in order to receive a command of the human agent to determine whether there is a need for counselor switching, without directly switching into a counselor dialogue mode, as described above.

Figure 6:
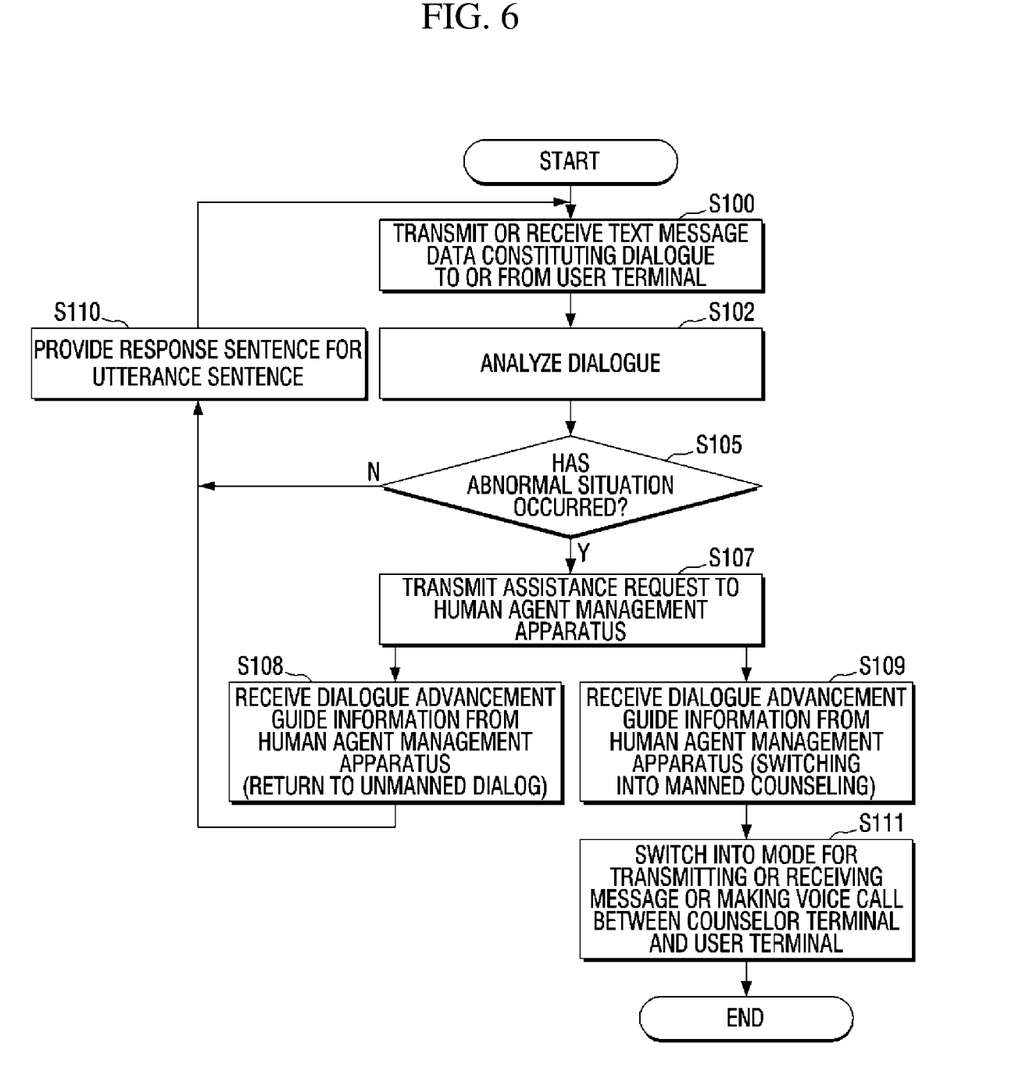
FIG. 6 is a second flowchart of an unmanned dialogue service providing method according to an embodiment.

A method of automatically switching into a counselor dialogue mode according to determination of the human agent will be briefly described below with reference to FIG. 6.

By transmitting or receiving text message data constituting a dialogue to or from a user terminal, an unmanned dialogue is made between a user and a chatting bot (S100). Then, the unmanned dialogue is analyzed (S102). When a result of the analysis is that an abnormal situation has not occurred (S105), a response sentence for an utterance sentence is provided (S110). When a result of the analysis is that an abnormal situation has occurred (S105), an assistance request is transmitted to a human agent management apparatus (S107). In this case, the user does not perform any operation to receive assistance from the human agent instead of the chatting bot.

Dialogue advancement guide information is received from the human agent management apparatus. When the received information indicates returning to the unmanned dialogue (S110), a response sentence for an utterance sentence is provided (S110). When the received information indicates switching into a human counselor (S109), switching is automatically made into a mode for relaying transmission or reception of messages between the user terminal and a counselor terminal. Even in this case, the user does not perform any operation to make a dialogue with a counselor. That is, according to this embodiment, the switching into the dialogue with the counselor during the dialogue with the chatting bot is fully automatically carried out without the user's operation.

In some embodiments of the inventive concept, the operation performed when it is determined that the dialogue is in an abnormal situation will be described below with reference to FIGS. 7A to 7C.

Another type in which an abnormal situation has occurred is a case in which a negative expression is detected from a dialogue. In this case, for a minor issue, the human agent may make a selection to continue an unmanned counseling as shown in FIG. 7A. For an issue in which it is not easy to maintain a dialogue, the human agent may make a selection to switch into a manned counseling (chatting) as shown in FIG. 7B. For an issue in which it is not possible to maintain a dialogue through chatting, the human agent may make a selection to switch into a manned counseling (phone) as shown in FIG. 7C. That is, the unmanned dialogue service providing method according to this embodiment may switch into a manned counseling after preferential determination by the human agent.

The above-described methods according to embodiments of the inventive concept may be performed by executing a computer program embodied in computer-readable code. The computer program may be transmitted from a first computing device to a second computing device via a network, such as the Internet, and may be installed in, and used by, the second computing device. The first computing device and the second computing device include a server apparatus, a physical server belonging to a server pool for a cloud service, and a stationary computing device such as a desktop personal computer (PC).

The computer program may be stored in a recording medium such as a digital versatile disc-read only memory (DVD-ROM), a flash memory device, or the like.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not purposes of limitation.

What is claimed is:

1. A method of providing an unmanned dialogue service, which is performed by an unmanned dialogue service apparatus, the method comprising:
   transmitting or receiving text message data constituting a dialogue to or from a user terminal in an unmanned dialogue model;
   analyzing the dialogue and determining whether a counselor switching situation has occurred;
   based on determining that the counselor switching situation has occurred, transmitting an assistance request including information regarding the dialogue to a human agent system; and
   automatically switching into a mode for transmitting or receiving messages between the user terminal and a counselor terminal in response to a counselor switching command input of a human agent through a human agent terminal, the human agent terminal being connected to the human agent system, and the human agent terminal receiving a task for processing the assistance request allocated by the human agent system.

2. The method of claim 1,
   wherein the determining whether the counselor switching situation has occurred comprises determining that the counselor switching situation has occurred based on a predetermined expression being detected from text constituting the dialogue, and
   wherein the predetermined expression comprises a keyword and a natural language expression indicating a human-counselor-dedicated task.

3. The method of claim 1, wherein the determining whether the counselor switching situation has occurred comprises:
   identifying an intention of a message recently received from the user terminal; and
   determining that the counselor switching situation has occurred based on the identified intention being a request for processing a human-counselor-dedicated task.

4. The method of claim 1, wherein the determining whether the counselor switching situation has occurred comprises:

detecting a negative expression from text constituting the dialogue that is received from the user terminal; and determining whether the counselor switching situation has occurred by using at least one from among a number of abnormal situations detected and a frequency of abnormal situations detected.

5. The method of claim 1, wherein the determining whether the counselor switching situation has occurred comprises determining that the counselor switching situation has occurred based on an expression for calling a counselor being detected from text constituting the dialogue that is received from the user terminal.

6. The method of claim 1, wherein the determining whether the counselor switching situation has occurred comprises determining that the counselor switching situation has occurred based on it not being possible to identify an intention of a message recently received from the user terminal according to a dialogue model of the dialogue, and a counter-question for identifying the intention being asked at least a predetermined number of times.

7. The method of claim 1, wherein the determining whether the counselor switching situation has occurred comprises determining that the counselor switching situation has occurred based on a dialogue model of the dialogue being a scenario model and slot filling not being completed after a user answer being made a predetermined number of times.

8. The method of claim 1, wherein the determining whether the counselor switching situation has occurred comprises determining that the counselor switching situation has occurred based on a duration of the dialogue exceeding a reference time.

9. The method of claim 1, wherein the human agent terminal provides a user interface for additionally allowing an input for a command of returning to the unmanned dialogue model.

10. An unmanned dialogue service apparatus comprising:
an utterance data input interface configured to transmit or receive text message data constituting a dialogue to or from a user terminal in an unmanned dialogue model; and
a counselor switching situation determiner configured to:
analyze the dialogue and determine whether a counselor switching situation has occurred;
transmit an assistance request including information regarding the dialogue to a human agent system; and
automatically switching into a mode for transmitting or receiving messages between the user terminal and a counselor terminal in response to a counselor switching command input of a human agent through a human agent terminal, the human agent terminal being connected to the human agent system, and the human agent terminal receiving a task for processing the assistance request allocated by the human agent system.

11. The unmanned dialogue service apparatus of claim 10, wherein the counselor switching situation determiner is further configured to determine that the counselor switching situation has occurred based on a predetermined expression being detected from text constituting the dialogue, and wherein the predetermined expression comprises a keyword and a natural language expression indicating a human-counselor-dedicated task.

12. The unmanned dialogue service apparatus of claim 10, wherein the counselor switching situation determiner is further configured to:
identify an intention of a message recently received from the user terminal, and
determine that the counselor switching situation has occurred based on the identified intention being a request for processing a human-counselor-dedicated task.

13. The unmanned dialogue service apparatus of claim 10, wherein the counselor switching situation determiner is further configured to:
detect a negative expression from text constituting the dialogue that is received from the user terminal, and
determine whether the counselor switching situation has occurred by using at least one from among a number of abnormal situations detected and a frequency of abnormal situations detected.

14. The unmanned dialogue service apparatus of claim 10, wherein the counselor switching situation determiner is configured to determine that the counselor switching situation has occurred based on an expression for calling a counselor being detected from text constituting the dialogue that is received from the user terminal.

15. The unmanned dialogue service apparatus of claim 10, wherein the counselor switching situation determiner is further configured to determine that the counselor switching situation has occurred based on it not being possible to identify an intention of a message recently received from the user terminal according to a dialogue model of the dialogue, and a counter-question for identifying the intention being asked at least a predetermined number of times.

16. The unmanned dialogue service apparatus of claim 10, wherein the counselor switching situation determiner is configured to determine that the counselor switching situation has occurred based on a dialogue model of the dialogue being a scenario model and slot filling not being completed after a user answer being made a predetermined number of times.

17. The unmanned dialogue service apparatus of claim 10, wherein the counselor switching situation determiner is further configured to determine that the counselor switching situation has occurred based on a duration of the dialogue exceeding a reference time.

18. The unmanned dialogue service apparatus of claim 10, the human agent terminal provides a user interface for additionally allowing an input for a command of returning to the unmanned dialogue model.

* * * * *